United States Patent [19]
Ivel

[11] Patent Number: 5,399,042
[45] Date of Patent: Mar. 21, 1995

[54] AXIAL/RADIAL SWIVEL

[76] Inventor: Leonard L. Ivel, 130 Pleasant St., Leicester, Mass. 01524

[21] Appl. No.: 72,440

[22] Filed: Jun. 7, 1993

[51] Int. Cl.[6] ............................................. F16D 1/12
[52] U.S. Cl. .................................. 403/165; 403/78; 59/95
[58] Field of Search .............. 403/164, 165, 78, 60, 403/41; 59/90, 95

[56] References Cited

U.S. PATENT DOCUMENTS

| | | | |
|---|---|---|---|
| 2,466,243 | 4/1949 | Johnson | 59/95 |
| 2,625,005 | 1/1953 | Myers | 59/95 |
| 2,651,533 | 9/1953 | Miller | 287/91 |
| 2,811,378 | 10/1957 | Kalista | 287/91 |
| 3,230,004 | 1/1966 | Lock | 59/95 |
| 3,940,194 | 2/1976 | Asberg | 308/236 |
| 4,600,331 | 7/1986 | Gray | 403/165 |
| 4,687,365 | 8/1987 | Promersberger | 403/2 |
| 4,708,382 | 11/1987 | LaCount | 403/78 |
| 4,911,579 | 3/1990 | Lutz et al. | 405/184 |

FOREIGN PATENT DOCUMENTS

47830  11/1969  Germany ............... 403/165

Primary Examiner—John T. Kwon
Attorney, Agent, or Firm—Thomas M. Champagne; Jon L. Roberts

[57] ABSTRACT

A swivel utilizing multiple angular contact bearings arranged in such a manner as to provide preloading for two-directional axial and radial thrust stability. This bearing arrangement of angular contact ball bearings applied to swivels adds capabilities of compression and side loading. The boring operations for which the present invention is primarily intended commonly take place in a pressurized environment of liquid and dirt slurry, thereby making sealing of the bearing cavity critical to the exclusion of foreign material which would damage the bearings. The rigidity of the assembly provided by the preloaded bearings creates critical stability in the seal area. The swivel provides the capability for bi-directional axial load support, radial load support, and a sealed inner bearing structure for both passive swivel and power driven swivel products. A particular load capacity is obtained through application of counterpoised arrangements of particular sizes of angular contact ball bearings.

11 Claims, 7 Drawing Sheets

AXIAL/RADIAL SWIVEL

FIELD OF THE INVENTION

The present invention relates generally to swivels used under loading conditions and in particular to swivels used in underground boring operations. This type of operation differs from lifting and pulling operations in which swivels are used to connect lifting or pulling lines to loads in order to allow relative rotation between the line and the load. Any rotation present in these applications is generally a result of the torque and rotation developed from applying tension to the spirally formed rope or wire rope. Boring operations for which the present invention is intended employ driven rotation and not only tension loads, but elements of compression loading and side loading.

BACKGROUND OF THE INVENTION

Commercial swivels are used to connect lifting or pulling lines to loads. The swivel permits relative rotation between the line and the load. Arrangements of angular contact ball bearings are commonly used in the higher performance end of commercially available swivels. The arrangement normally used supports a load in only the hanging weight direction and does not provide for load bearing characteristics in the opposite axial direction or for radially applied loading. For example, U.S. Pat. No. 2,466,243 to Johnson discloses a swivel used as a component in a fishing lure. The swivel utilizes ball bearings to provide a rolling contact between two spindles and their respective annular bearing surfaces. The swivel relies on the bearings during times when the spindles are being pulled apart. The bearings would serve no useful function when the swivel is subject to compressive or radial forces. The sealing quality of the swivel relies on the fit between the spindles and the body of the device. Another reference, U.S. Pat. No. 2,811,378 to Kalista, discloses a heavy tension load safety swivel. This swivel is not intended nor suitable for use in conditions involving compression loads or radial loads. A sealing ring is provided to protect the bearing elements from contaminants. U.S. Pat. No. 4,687,365 to Promersberger discloses a load limited swivel connector. This device is adapted for use with only tension loads, and in fact incorporates a safeguard to protect the load lines connected on either side of the swivel.

In such swivels, a rotational force is commonly applied through the torque developed from reeling in spirally wound fiber or wire rope which would cause the load to rotate if not counteracted. The torque is normally decoupled in crane operations and other lifting applications by interposing a swivel designed to operate passively under solely tension loading conditions between the lifting cable and the swivel. As previously stated, the higher performance end designs of such swivels usually utilize angular contact ball bearings which are designed to provide maximum support in one direction and are oriented within the swivel so as to provide support in one axial direction only. Users of commercially available swivels marketed for use in these and other smooth lift applications are generally cautioned against the use of the swivels under side loading or backloading conditions and against the use of such swivels in liquid or liquid-solid slurry environments. At least one previous design has attempted to use ball bearings to provide multidimensional support for a swivel. U.S. Pat. No. 2,651,533 to Miller discloses a swivel for a loading hook. A series of vertically stacked annular ball bearing sets are fitted within the bore of the swivel. This reference states that the bearings distribute radial, axial tension, and axial compression loads. The bearings, however, are of standard design, and are not adapted for loads in any particular direction. Although they can probably distribute light multidirectional loads adequately, the bearings probably cannot handle a large load in any one direction due to the fact that each bearing must be able to withstand a load in any direction. Such a shortcoming limits the uses to which the swivel may be put. A sealing ring is used to keep the bearings free from contamination.

The one-directional thrust orientation of most angular contact bearings provides the stability required for effective sealing only when the unit is subjected to the thrust load in one direction. Thus, when loaded or subject to force in the intended direction of use, an angular contact bearing exhibits superior support characteristics, but when the unit is not loaded or is reverse loaded it has no stability and allows relative radial movement between the inner and outer elements in the seal area. This movement renders the seal ineffective, allowing possibly damaging material to enter the bearing housing area, and allowing lubricants or other essential materials to exit the bearing housing area.

Swivels utilized in underground boring and certain deep sea applications, however, experience bi-directional axial loading as well as side thrust components of loading and require multidirectional support. In these and other applications, swivel mechanisms are also exposed to sandy, liquid, or liquid-particulate solids type environments. The body of the swivel, which contains the bearings, must therefore be sealed against penetration by elements of such an environment regardless of the direction of loading or thrust at any given time. Other swivel devices have been used for such applications. U.S. Pat. No. 4,911,579 to Lutz et al. discloses a swivel arrangement for connecting a boring or reaming tool to a cable. As the boring or reaming tool creates a conduit for a cable, the cable itself is pulled along behind the tool and installed in the same step. The tool is divided into two main parts which are connected by a swivel mechanism. The swivel mechanism ensures that the cable does not twist or rotate with the motion of the boring tool. The design of the swivel mechanism itself is not described in detail. Rather, the reference is directed primarily to the method of connecting the swivel mechanism to the two main parts of the device.

In deep sea applications, this task is more complicated in that the seal must also be able to sustain high water pressure. The requirements of high reliability under bi-directional axial loading and side thrust loading and operation in a hostile medium have not been provided by existing swivel designs.

SUMMARY OF THE INVENTION

It is therefore an object of the present invention to provide a swivel that is designed for axial loading in two directions.

It is a further object of the present invention to provide a swivel that is designed for compression loading as well as tension loading.

It is an additional object of the present invention to provide a swivel that is designed for side thrust loading.

It is another object of the present invention to provide a swivel, the active elements of which are sealed from the environment under all conditions of tension, compression, and side thrust loading.

It is still a further object of the present invention to provide a swivel, the active elements of which are sealed from the environment under high external pressure operational conditions.

These and other objects and advantages of the present invention will be apparent to those skilled in the art after inspection of the drawings, detailed description, and appended claims.

The swivel of the present invention utilizes multiple angular contact bearings arranged in such a manner as to provide preloading for two-directional axial and radial thrust stability. This bearing arrangement of angular contact ball bearings applied to swivels adds capabilities of compression and side loading not previously provided in ball bearing swivels, which usually provide only tension loading support or compression and side loading support at the expense of tension support. The boring operations for which the present invention is primarily intended commonly take place in a pressurized environment of liquid and dirt slurry, thereby making sealing of the bearing cavity critical to the exclusion of foreign material which would damage the bearings. The rigidity of the assembly provided by the preloaded bearings creates critical stability in the seal area which is not found in conventional single direction thrust swivel designs.

Underground boring, pipe lining, pipe reaming, and fishnet dragging are among the operations that involve not only straight axial tension loads on a swivel, but also elements of compression loading, side loading, and harsh working environments. Many applications also require powered rotary motion with the swivel located close to an active tool. The present invention provides the capability for bi-directional axial load support, radial load support, and a sealed inner bearing structure for both passive swivel and power driven swivel products. Swivels produced using the principles of the present invention can range in size from light to heavy depending on the axial loads involved in the particular application. Swivel devices can therefore be produced for the applications listed above as well as for others requiring a sealed multi-directional load capability swivel. A particular load capacity is obtained through novel application of counterpoised arrangements of particular sizes of angular contact ball bearings as well as the geometric design of the metal parts which are elements of the swivel. Both the bearing arrangement and the design of the metal parts, individually and working together, are novel aspects of the present invention, and lead to the unique performance characteristics obtainable for devices which utilize the present invention.

DETAILED DESCRIPTION

Figure 1:
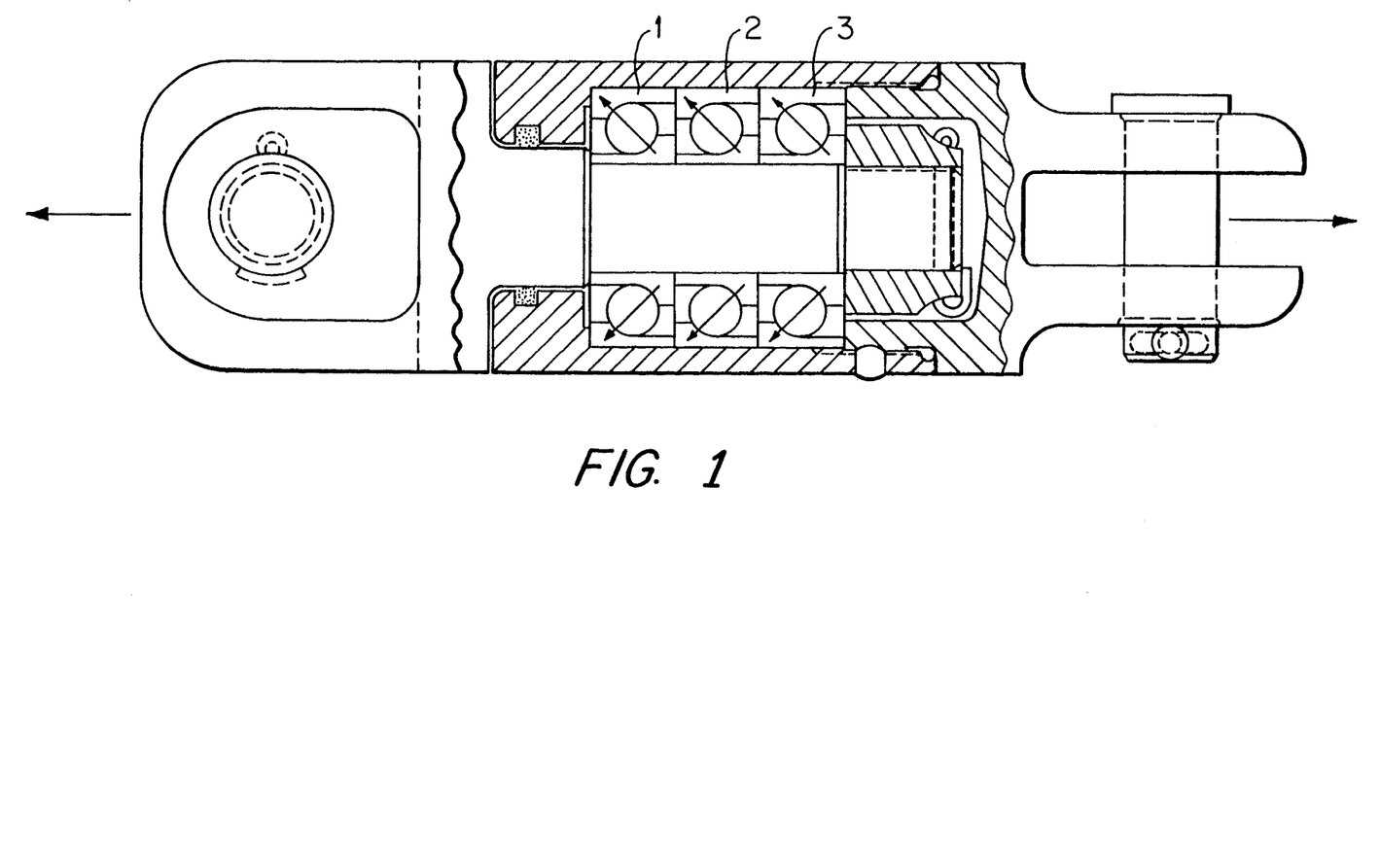
FIG. 1 shows a swivel device that provides support for tension loads only.

FIG. 1 shows an embodiment of the swivel of the present invention with the angular contact ball bearings 1, 2, and 3 oriented so as to only provide support for tension loads, as is currently prevalent in the art. Each angular contact ball bearing includes an inner race ring, a corresponding outer race ring, and a plurality of ball bearings located between each corresponding inner race ring and outer race ring. Means are provided at either end of the swivel for connection to a line, a drill or similar power tool, or any other entity which requires a power driven or passive swivel connection to an entity connected to the other end of the swivel.

Figure 2:
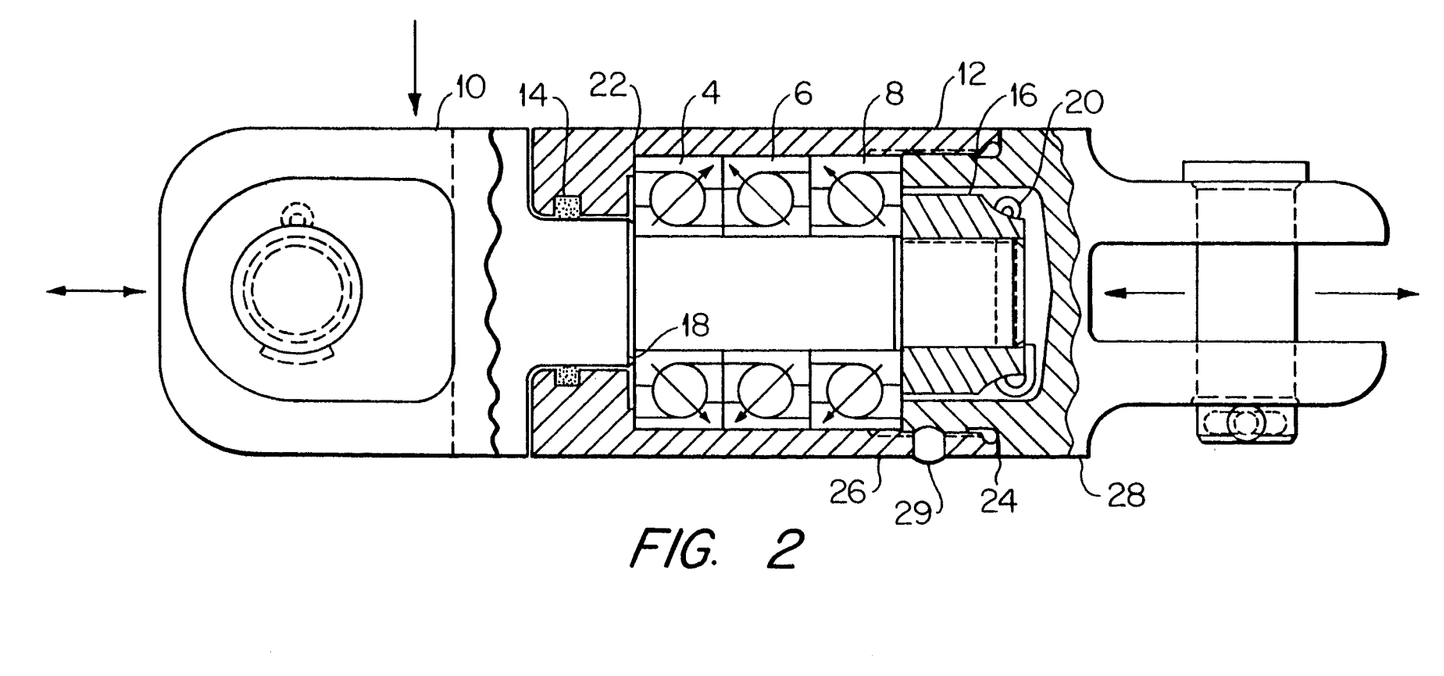
FIG. 2 shows a cross section of the swivel device of the present invention used in a passive swivel application.

Another embodiment of the present invention is shown in cross section in FIG. 2 for a passive swivel application. A counterpoised arrangement of stacked angular contact ball bearings 4, 6 and 8 in this embodiment provides two-direction axial load bearing capability. The angular contact ball bearings 4, 6 and 8 are placed in a bore in swivel body 12 under a preload condition previous to assembly so that displacement under operational loading is minimal and the bearing elements are stable in both directions of axial load and under radial load. The bearings 4, 6 and 8, shank 10, and body 12 of the swivel are locked together such that they furnish load bearing under both directions of axial loading as well as during radial loading. Additionally, because of this counterpoised arrangement of angular contact ball bearings 4, 6 and 8, the assembly itself, including the area around the seal 14, is stable under all conditions of loading. Therefore, swivels designed according to the present invention are suitable for use in invasive environments.

As is well known in the art, preloaded angular contact ball bearings will transmit axial loads on the shank from the inner races of the bearings through the ball itself to the outer race of the ball bearing, if oriented to transmit an axial load force in the direction the load is applied. When oriented in the opposite direction, the load force will not be supported by the bearings and damage to elements of the swivel may result. A combination of angular contact ball bearings in which at least one bearing is oriented to support a tension axial load and at least one bearing is oriented to support a compression axial load will therefore be able to support axial loads in either direction. Because the bearings 4, 6, and 8 utilized by the present invention are preloaded within the swivel body 12, radial loads on the shank 10 are distributed to the inner races of the bearings 4, 6, and 8 as well. The load forces are then carried through the balls to the outer races and then to the swivel body 12. The lines of force are perpendicular to the cooperating faces of corresponding races.

As shown in FIG. 2, the bearings 4, 6 and 8 have been loaded into the body 12 of the swivel. It should be noted that this particular embodiment utilizes two bearings 6 and 8 oriented to support a hanging load and one bearing 4 to support a compressional load. The seal 14 is positioned in the body 12 before the installation of the shank 10. The shank 10 of the swivel, having a threaded top end, is installed by slipping it through the seal 14 and through the inner race rings of the bearings 4, 6 and 8. The bearings are designed to seat themselves only under load. A retention nut 16 or other retention means is tightened down on the threaded top end of the shank 10 to preload the bearings between the retention nut 16 at an annular ridge 18 on the shank 10. A retention pin 20 is then inserted to prevent the nut from rotating. It should be noted that the inner race ring of the bottom bearing 4 rests on a shelf or annular ridge 18 on the bottom portion of the swivel shank 10. The corresponding outer race ring of the bottom bearing 4 rests on an annular surface 22 or shoulder on the inside diameter of the body 12. The inner race ring of the top angular contact ball bearing rests on the retention nut 16. Once assembled, the annular ridge 18 of the shank 10 aligns with the annular shoulder 22 of the swivel body 12.

The body 12 of the swivel comprises two major parts: a barrel 26 and a cap 28. The barrel 26 and cap 28 are threaded so as to mate to form the swivel body 12. After the bearings 4, 6, and 8 have been inserted into the barrel 26, the seal 14 and shank 10 have been inserted, and the retention nut 16 has been tightened down on the top end of the shank, the cap 28 is screwed onto the top end of the barrel 26 to complete assembly of the swivel body 12. The outer race ring of the top angular contact ball bearing 8 is held in place by screwing the cap 28 down firmly on the outer race ring. The cap 28 is prevented from unscrewing by a plug insert 29. A compression seal 24 is provided between the barrel 26 and the cap 28 to prevent any external media from entering the inner structure of the swivel, because external media such as fluids, dust, sand, gravel, or any other substance that could otherwise enter the swivel can cause moving parts to stick and could break or wear down components of the swivel. The compression seal 24 can be of an elastomer construction or may be a metal compressional seal or any other equivalent.

Figure 3:
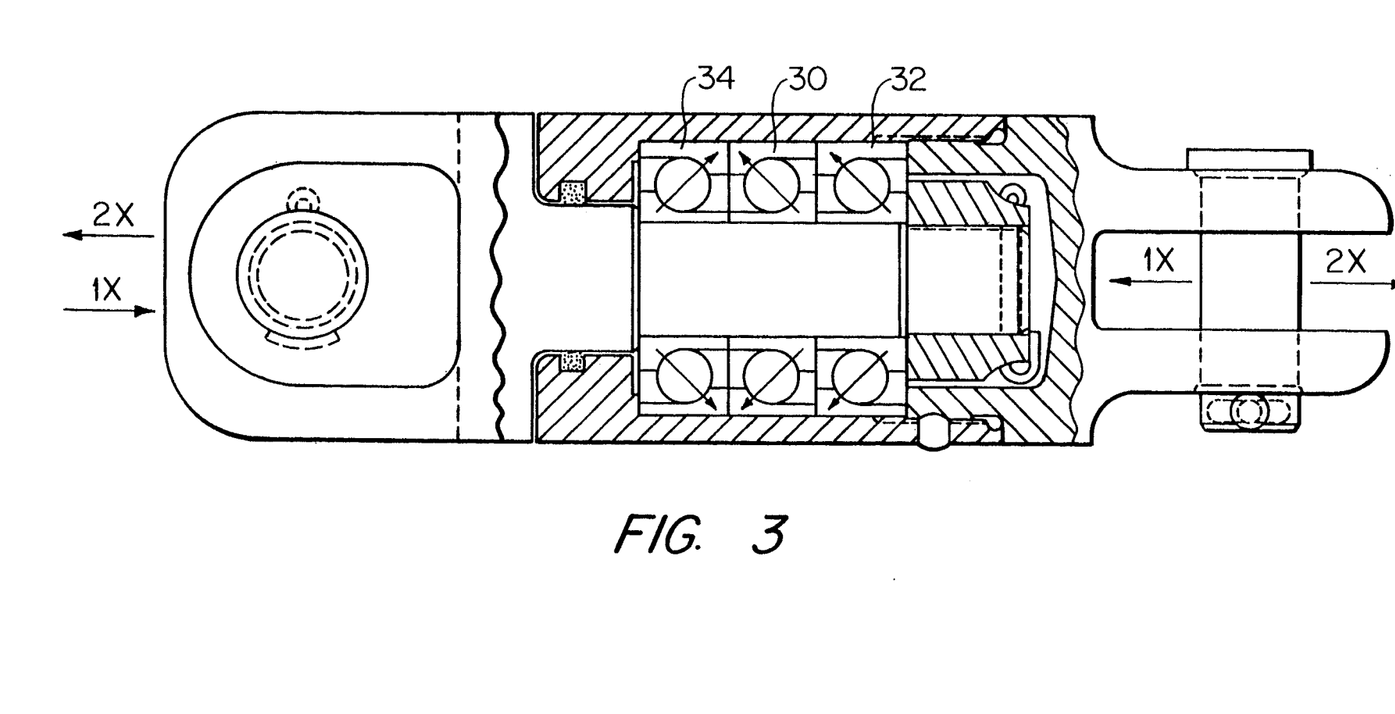
FIG. 3 shows the swivel device of the present invention, providing compression support and twice as much tension support.
Figure 4:
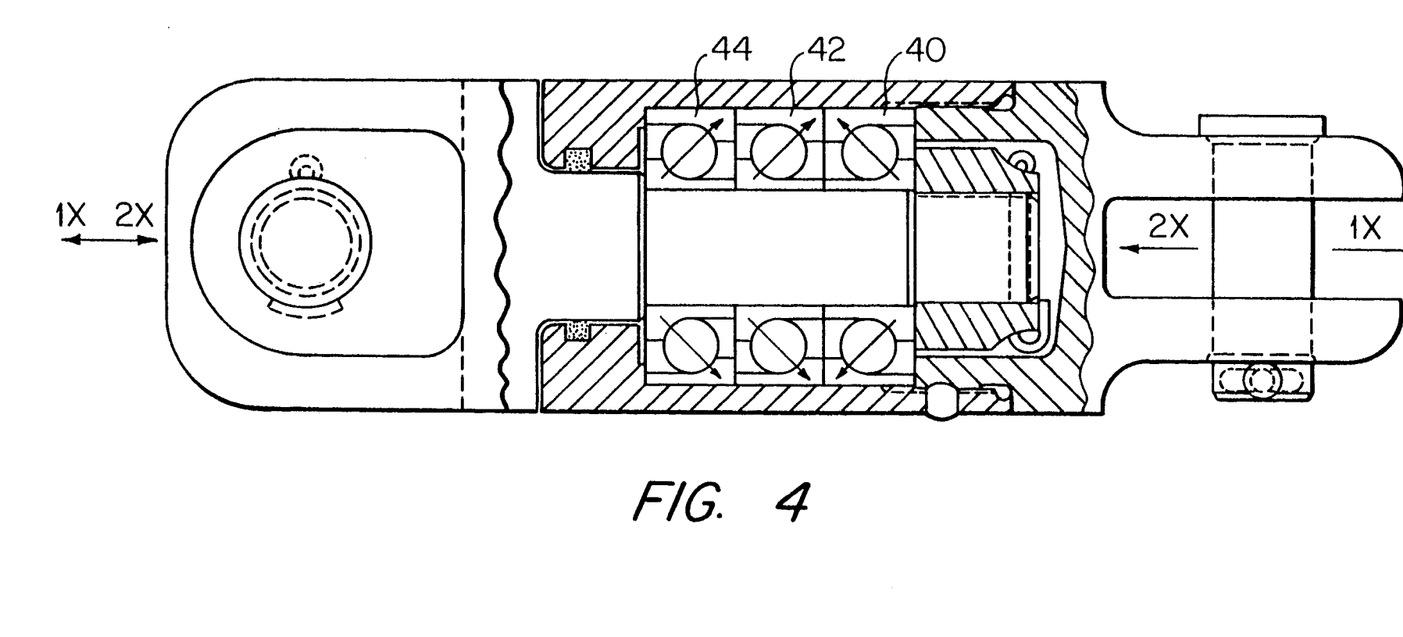
FIG. 4 shows the swivel device of the present invention, providing tension support and twice as much compression support.
Figure 5:
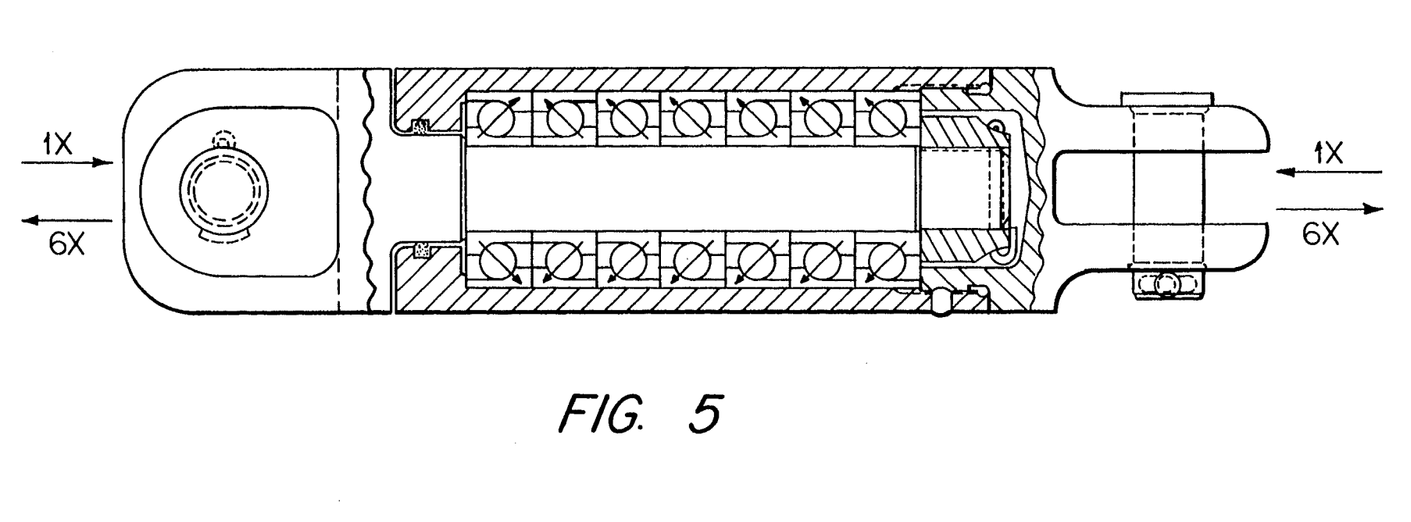
FIG. 5 shows the swivel device of the present invention, providing compression support and six times as much tension support.
Figure 6:
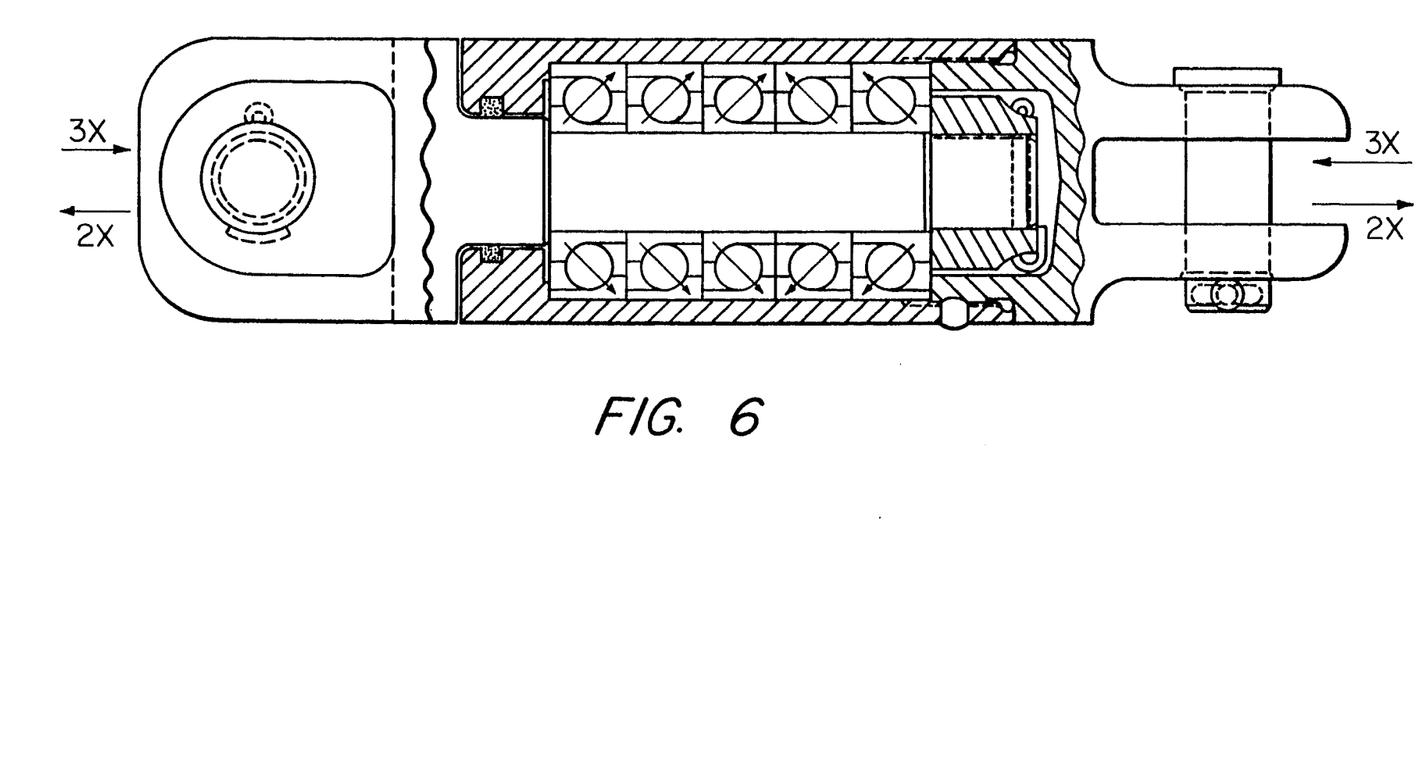
FIG. 6 shows the swivel device of the present invention, providing tension support and one and one half times as much compression support.
Figure 7:
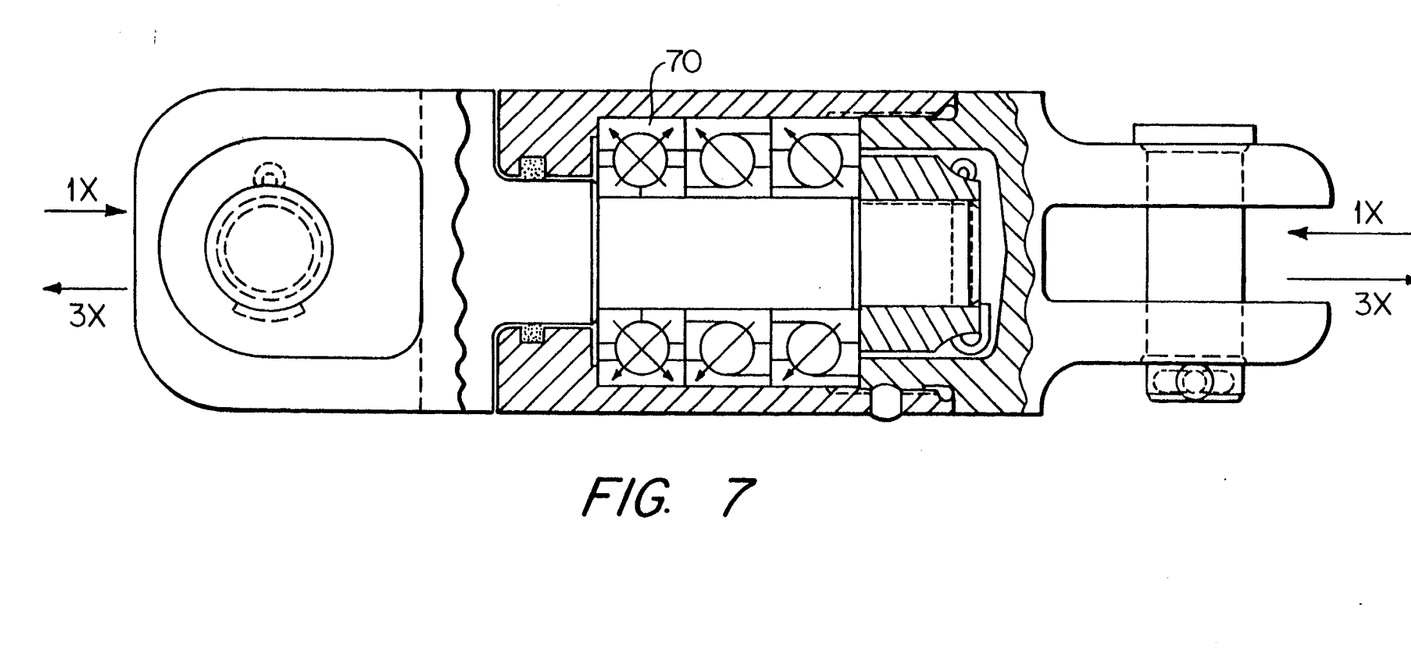
FIG. 7 shows the swivel device of the present invention, utilizing a split ring angular contact bearing to provide both tension and compression support.

Two angular contact ball bearings placed in the same thrust support orientation behave in an additive manner. It is essentially accurate that doubling the number of bearings doubles the capacity in the thrust direction. Likewise, tripling the number of bearings in a given thrust direction triples the capacity in that direction. In FIG. 3, two angular contact ball bearings 30 and 32 are arranged such that the primary axial load capacity would support a normal tensional load. In addition, a compressional load would be supported at one half the capacity of the tensional load by a third angular contact ball bearing 34. In FIG. 4, the bearing arrangement is reversed such that the swivel has twice the compressional load capability compares to the tensional load capacity. Bearing 40 supports a tensional load, while a compressional load would be supported at twice that capacity by bearings 42 and 44. In FIG. 5, the primary tensional axial capacity is increased to approximately threefold that of the embodiment shown in FIG. 3, while the compressional capacity is the same as that of the embodiment shown in FIG. 3. In FIG. 6, the tensional capacity is the same as that of the embodiment shown in FIG. 3, while the compressional capacity is increased to threefold that of the embodiment shown in FIG. 3. In FIG. 7, an additional feature is added to the combination of single direction angular contact ball bearings by the addition of a split ring angular contact bearing 70. The split ring bearing 70 provides support in both axial directions. For example, a swivel containing a single angular direction ball bearing and a split ring bearing would have the same capacity as a three bearing counterpoised bearing assembly.

The present invention therefore uses an arrangement of multiples of angular contact bearings as illustrated in the figures and examples to provide a design capacity for a swivel device for particular tensional, compressional, and radial loads, all in one swivel design. The actual number and orientation of the angular contact bearings will depend on the magnitude of the loads expected to be encountered as well as the ratio of tensional loads to compressional loads expected.

Preferred and alternate embodiments of the present invention have now been described in detail. It is to be noted, however, that this description of these specific embodiments is merely illustrative of the principles underlying the inventive concept. It is therefore contemplated that various modifications of the disclosed embodiments will, without departing from the spirit and scope of the invention, be apparent to persons skilled in the art.

What is claimed is:

1. A swivel device comprising:
   a) a body having a bore and an annular shoulder;
   b) a shank having a top end, a bottom portion, and an annular ridge at the bottom portion of the shank, the shank inserted into the bore of the body and the annular ridge of the shank aligning with the annular shoulder of the body; and
   c) a plurality of angular contact ball bearings, including a top angular contact ball bearing and a bottom angular contact ball bearing, located in the bore of the body;
   d) the plurality of angular contact ball bearings each having an inner race ring, a corresponding outer race ring, and a plurality of ball bearings between each corresponding inner race ring and outer race ring;
   e) the plurality of angular contact ball bearings arranged in a stack within the bore of the body, the outer race ring of the bottom angular contact ball bearing being in contact with the annular shoulder of the body and the inner race ring of the bottom angular contact ball bearing being in contact with the annular ridge of the shank;
   f) the swivel device further comprising a retention means for ensuring the plurality of angular contact ball bearings remain arranged in a stack and in contact with the annular shoulder of the body and the annular ridge of the shank, the retention means being fixed to the top end of the shank;
   g) at least one angular contact ball bearing oriented such that the angular contact ball bearing provides support for the swivel device when the swivel device experiences a tension load, and at least one angular contact ball bearing oriented such that the angular contact ball bearing provides support for the swivel device when the swivel device experiences a compression load.

2. The swivel device of claim 1, further comprising a seal, located between the body and the shank and in contact with the bottom portion of the shank.

3. The swivel device of claim 1, wherein the retention means is a retention nut.

4. The swivel device of claim 1, further comprising at least one split ring angular contact bearing located among the stack of angular contact ball bearings.

5. The swivel device of claim 1, wherein the body comprises:
   a) a barrel; and
   b) a cap;
   c) the barrel and the cap being threaded so as to mate to form the body; and
   d) the cap being in contact with the top angular contact ball bearing such that the plurality of angular contact ball bearings are held in place in the bore.

6. The swivel device of claim 5, wherein the body further comprises a compression seal, located at a point of contact between the barrel and the cap, the compression seal preventing external media from entering the bore.

7. A swivel device comprising:
   a) a barrel having a bore and an annular shoulder;
   b) a cap;
   c) a shank having a top end, a bottom portion, and an annular ridge at the bottom portion of the shank, the shank inserted into the bore of the barrel and the annular ridge of the shank aligning with the annular shoulder of the barrel; and
   d) a plurality of angular contact ball bearings, including a top angular contact ball bearing and a bottom angular contact ball bearing, located in the bore of the barrel;
   e) the plurality of angular contact ball bearings each having an inner race ring, a corresponding outer race ring, and a plurality of ball bearings between each corresponding inner race ring and outer race ring;
   f) the plurality of angular contact ball bearings arranged in a stack within the bore of the barrel, the outer race ring of the bottom angular contact ball bearing being in contact with the annular shoulder of the barrel and the inner race ring of the bottom angular contact ball bearing being in contact with the annular ridge of the shank;
   g) the swivel device further comprising a retention means for ensuring the plurality of angular contact ball bearings remain arranged in a stack and in contact with the annular shoulder of the barrel and the annular ridge of the shank, the retention means being fixed to the top end of the shank;
   h) at least one angular contact ball bearing oriented such that the angular contact ball bearing provides support for the swivel device when the swivel device experiences a tension load, and at least one angular contact ball bearing oriented such that the angular contact ball bearing provides support for the swivel device when the swivel device experiences a compression load;
   i) the barrel and the cap being threaded so as to mate; and
   j) the cap being in contact with the top angular contact ball bearing such that the plurality of angular contact ball bearings are held in place in the bore.

8. The swivel device of claim 7, further comprising a compression seal, located at a point of contact between the barrel and the cap, the compression seal preventing external media from entering the bore.

9. The swivel device of claim 7, further comprising a seal, located between the barrel and the shank and in contact with the bottom portion of the shank.

10. The swivel device of claim 7, wherein the retention means is a retention nut.

11. The swivel device of claim 7, further comprising at least one split ring angular contact bearing located among the stack of angular contact ball bearings.

* * * * *